United States Patent
Lin et al.

(10) Patent No.: US 10,762,155 B2
(45) Date of Patent: Sep. 1, 2020

(54) SYSTEM AND METHOD FOR FILTERING EXCERPT WEBPAGES

(71) Applicant: International Business Machines Corporation, Armonk, NY (US)

(72) Inventors: June-Ray Lin, Taipei (TW); Curtis CH Wei, Taipei (TW); Hsieh-Lung Yang, Taipei (TW); Ying-Chen Yu, Taipei (TW); Chia-Heng Lin, Taipei (TW); Ci-Hao Wu, Taipei (TW); Chen-Yu Huang, Taipei (TW); Kuei-Ching Lee, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 16/167,653

(22) Filed: Oct. 23, 2018

(65) Prior Publication Data
US 2020/0125681 A1 Apr. 23, 2020

(51) Int. Cl.
*G06F 16/00* (2019.01)
*G06F 16/9535* (2019.01)
*G06K 9/62* (2006.01)
*G06F 16/335* (2019.01)
*G06F 16/955* (2019.01)

(52) U.S. Cl.
CPC ........ *G06F 16/9535* (2019.01); *G06F 16/335* (2019.01); *G06K 9/6269* (2013.01); *G06F 16/955* (2019.01)

(58) Field of Classification Search
CPC . G06K 9/6269; G06F 16/9535; G06F 16/335; G06F 16/955
See application file for complete search history.

(56) References Cited

U.S. PATENT DOCUMENTS

| 7,308,648 | B1 | 12/2007 | Buchthal et al. |
| 9,910,916 | B1 | 3/2018 | Tseng et al. |
| 2001/0042085 | A1 | 11/2001 | Peairs et al. |
| 2011/0035345 | A1 | 2/2011 | Duan et al. |
| 2011/0137898 | A1 | 6/2011 | Gordo et al. |
| 2013/0185287 | A1 | 7/2013 | Khaliq et al. |
| 2014/0372102 | A1 | 12/2014 | Hagege et al. |
| 2016/0342594 | A1 | 11/2016 | Jehan |

FOREIGN PATENT DOCUMENTS

| CN | 101106539 A | 1/2008 |
| CN | 101393555 A | 3/2009 |

OTHER PUBLICATIONS

R. Berwick, "An Idiots Guide to Support Vector Machines (SVMs)", web.mit.edu/6.034/wwwbob/svm.pdf, pp. 1-27, 2020. (Year: 2020).*

(Continued)

*Primary Examiner* — Cheryl Lewis
(74) *Attorney, Agent, or Firm* — Reza Sarbakhsh

(57) ABSTRACT

A method, computer program product, and computing system device for receiving, on a computing device, a plurality of webpages. At least one webpage may be filtered from the plurality of webpages into at least one set of webpages using a decision tree algorithm. At least one remaining webpage may be filtered from the plurality of webpages into the at least one set of webpages using a supported vector machine (SVM) algorithm.

20 Claims, 11 Drawing Sheets

(56) References Cited

OTHER PUBLICATIONS

Santosh Kumar, Xiaoying Gao, Ian Welch, and Masood Mansoori, "A Machine Learning Based Web Spam Filtering Approach", 2016 IEEE 30th International Conference on Advanced Information Networking and Applications, pp. 973-980. (Year: 2016).*

Rongbo Du, Reihaneh Safavi-Naini, and Willy Susilo, "Web Filtering Using Text Classification", IEEE, 2003, pp. 325-330. (Year: 2003).*

Michael Chau and Hsinchun Chen, "A Machine Learning Approach to Web Page Filtering Using Content and Structure Analysis", www.sciencedirect.com, Decision Support Systems 44 (2008), pp. 482-494. (Year: 2008).*

Alixin Sun, Ee-Peng Lim, and Wee-Keong Ng, "Web Classfication Using Support Vector Machine", WIDM'02, Nov. 8, 2002, ACM, pp. 96-99. (Year: 2002).*

Renukuntla et al., "Optimization of Excerpt Query Process for Packet Attribution System," https://ieeexplore.ieee.org/document/7064618/ dated Mar. 23, 2015, pp. 1-3.

* cited by examiner

SYSTEM AND METHOD FOR FILTERING EXCERPT WEBPAGES

BACKGROUND

The Internet may provide a source of training data for ML (Machine Learning) applications. However, it has proven quite challenging to filter out garbage/rubbish data in an efficient and effective way while collecting desirable training data. Conventional approaches use a "black list" to deal with unwanted training data by filtering out the URLs which are deemed as unwanted content. However it is inefficient and ineffective to utilize these black lists because a user must manually add URL entries in the black list in order to filter out newly found pages. As such, these conventional approaches may be laborious and passive.

BRIEF SUMMARY OF DISCLOSURE

In one example implementation, a computer-implemented method is executed on a computing device and may include but is not limited to receiving, on a computing device, a plurality of webpages. At least one webpage may be filtered from the plurality of webpages into at least one set of webpages using a decision tree algorithm. At least one remaining webpage may be filtered from the plurality of webpages into the at least one set of webpages using a supported vector machine (SVM) algorithm.

One or more of the following example features may be included. One or more webpages with an unseen hostname may be filtered from the plurality of webpages into the at least one set of webpages. One or more webpages may be filtered from the plurality of webpages into the at least one set of webpages based upon, at least in part, one or more pre-defined rules. One or more webpages may be filtered from the plurality of webpages into the at least one set of webpages based upon, at least in part, a set of false positive webpages. One or more webpages may be filtered from the plurality of webpages into the at least one set of webpages based upon, at least in part, a set of false negative webpages. The at least one set of webpages may include a set of normal webpages and a set of excerpt webpages. Filtering the at least one webpage into the at least one set of webpages using the decision tree algorithm may include one or more of filtering at least one webpage into a set of normal webpages based upon, at least in part, a first confidence score and filtering the at least one webpage into a set of excerpt webpages based upon, at least in part, a second confidence score.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to receiving, on a computing device, a plurality of webpages. At least one webpage may be filtered from the plurality of webpages into at least one set of webpages using a decision tree algorithm. At least one remaining webpage may be filtered from the plurality of webpages into the at least one set of webpages using a supported vector machine (SVM) algorithm.

One or more of the following example features may be included. One or more webpages with an unseen hostname may be filtered from the plurality of webpages into the at least one set of webpages. One or more webpages may be filtered from the plurality of webpages into the at least one set of webpages based upon, at least in part, one or more pre-defined rules. One or more webpages may be filtered from the plurality of webpages into the at least one set of webpages based upon, at least in part, a set of false positive webpages. One or more webpages may be filtered from the plurality of webpages into the at least one set of webpages based upon, at least in part, a set of false negative webpages. The at least one set of webpages may include a set of normal webpages and a set of excerpt webpages. Filtering the at least one webpage into the at least one set of webpages using the decision tree algorithm may include one or more of filtering at least one webpage into a set of normal webpages based upon, at least in part, a first confidence score and filtering the at least one webpage into a set of excerpt webpages based upon, at least in part, a second confidence score.

In another example implementation, a computing system may include one or more processors and one or more memories, wherein the computing system is configured to perform operations that may include but are not limited to receiving, on a computing device, a plurality of webpages. At least one webpage may be filtered from the plurality of webpages into at least one set of webpages using a decision tree algorithm. At least one remaining webpage may be filtered from the plurality of webpages into the at least one set of webpages using a supported vector machine (SVM) algorithm.

One or more of the following example features may be included. One or more webpages with an unseen hostname may be filtered from the plurality of webpages into the at least one set of webpages. One or more webpages may be filtered from the plurality of webpages into the at least one set of webpages based upon, at least in part, one or more pre-defined rules. One or more webpages may be filtered from the plurality of webpages into the at least one set of webpages based upon, at least in part, a set of false positive webpages. One or more webpages may be filtered from the plurality of webpages into the at least one set of webpages based upon, at least in part, a set of false negative webpages. The at least one set of webpages may include a set of normal webpages and a set of excerpt webpages. Filtering the at least one webpage into the at least one set of webpages using the decision tree algorithm may include one or more of filtering at least one webpage into a set of normal webpages based upon, at least in part, a first confidence score and filtering the at least one webpage into a set of excerpt webpages based upon, at least in part, a second confidence score.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

FIGS. 3-5 are example diagrammatic views of excerpt webpages according to one or more example implementations of the disclosure;

Like reference symbols in the various drawings indicate like elements.

DETAILED DESCRIPTION

Figure 1:
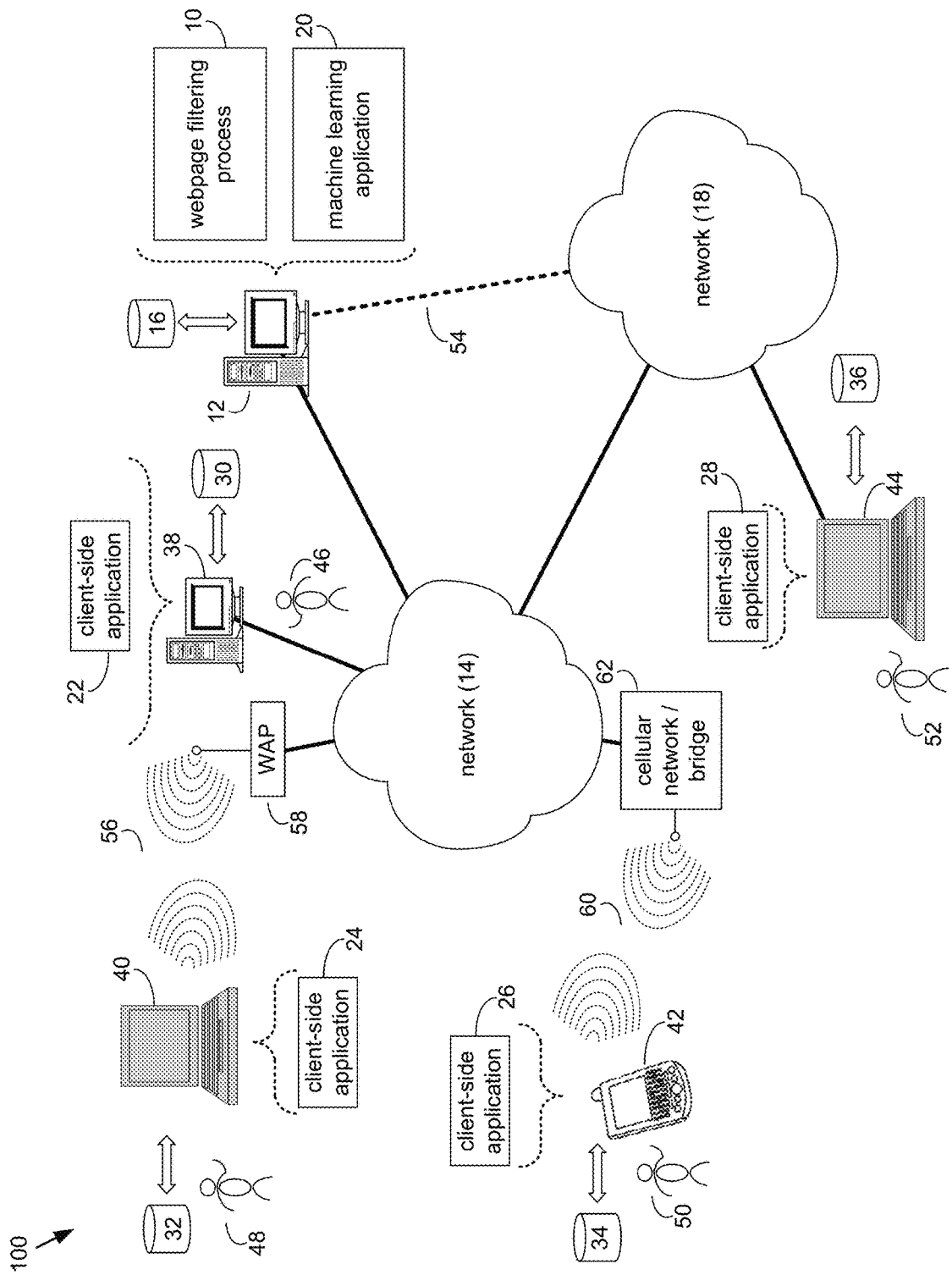
FIG. 1 is an example diagrammatic view of webpage filtering process coupled to a distributed computing network according to one or more example implementations of the disclosure.
Figure 2:
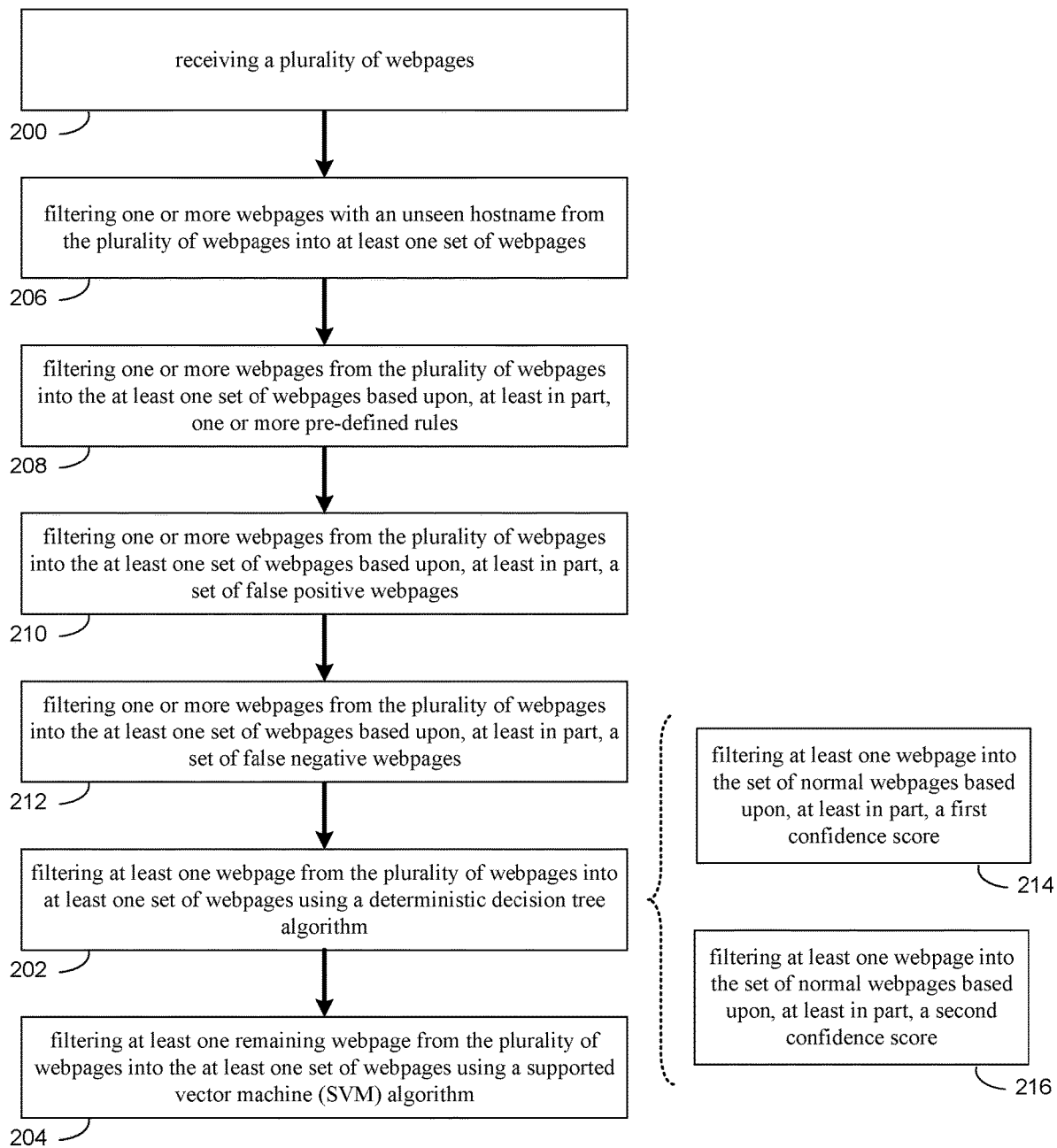
FIG. 2 is an example flowchart of the webpage filtering process of FIG. 1 according to one or more example implementations of the disclosure.
Figure 3:
Figure 3:
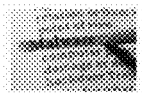
Figure 3:
Figure 3:
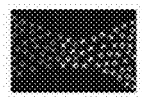
Figure 3:
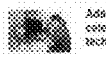
Figure 3:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown webpage filtering process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a webpage filtering process, such as webpage filtering process 10 of FIG. 1, may receive, on a computing device, a plurality of webpages. At least one webpage may be filtered from the plurality of webpages into at least one set of webpages using a decision tree algorithm. At least one remaining webpage may be filtered from the plurality of webpages into the at least one set of webpages using a supported vector machine (SVM) algorithm.

The instruction sets and subroutines of webpage filtering process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Webpage filtering process 10 may be a stand-alone application that interfaces with an applet/application that is accessed via client applications 22, 24, 26, 28, 66. In some embodiments, webpage filtering process 10 may be, in whole or in part, distributed in a cloud computing topology. In this way, computing device 12 and storage device 16 may refer to multiple devices, which may also be distributed throughout network 14 and/or network 18.

Computing device 12 may execute a machine learning application (e.g., machine learning application 20), examples of which may include, but are not limited to, applications configured to receive training data to develop or train machine learning algorithms for various applications, etc. One example of a machine learning application may generally include IBM Watson™ application. Webpage filtering process 10 and/or machine learning application 20 may be accessed via client applications 22, 24, 26, 28, 66. Webpage filtering process 10 may be a stand-alone application, or may be an applet/application/script/extension that may interact with and/or be executed within machine learning application 20, a component of machine learning application 20, and/or one or more of client applications 22, 24, 26, 28, 66. Machine learning application 20 may be a stand-alone application, or may be an applet/application/script/extension that may interact with and/or be executed within webpage filtering process 10, a component of webpage filtering process 10, and/or one or more of client applications 22, 24, 26, 28, 66. One or more of client applications 22, 24, 26, 28, 66 may be a stand-alone application, or may be an applet/application/script/extension that may interact with and/or be executed within and/or be a component of webpage filtering process 10 and/or machine learning application 20. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 66 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of webpage filtering process 10 (and vice versa). Accordingly, webpage filtering process 10 may be a purely server-side application, a purely client-side application, or a hybrid server-side/client-side application that is cooperatively executed by one or more of client applications 22, 24, 26, 28, 66 and/or webpage filtering process 10.

One or more of client applications 22, 24, 26, 28, may be configured to effectuate some or all of the functionality of machine learning application 20 (and vice versa). Accordingly, machine learning application 20 may be a purely server-side application, a purely client-side application, or a hybrid server-side/client-side application that is cooperatively executed by one or more of client applications 22, 24, 26, 28 and/or machine learning application 20. As one or more of client applications 22, 24, 26, 28, webpage filtering process 10, and machine learning application 20, taken singly or in any combination, may effectuate some or all of the same functionality, any description of effectuating such functionality via one or more of client applications 22, 24, 26, 28, webpage filtering process 10, machine learning application 20, or combination thereof, and any described interaction(s) between one or more of client applications 22, 24, 26, 28, webpage filtering process 10, machine learning application 20, or combination thereof to effectuate such functionality, should be taken as an example only and not to limit the scope of the disclosure.

Users 46, 48, 50, 52 may access computing device 12 and webpage filtering process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Webpage filtering process 10 may include one or more user interfaces, such as browsers and textual or graphical user interfaces, through which users 46, 48, 50, 52 may access webpage filtering process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-11, webpage filtering process 10 may receive 200, on a computing device, a plurality of webpages. At least one webpage may be filtered 202 from the plurality of webpages into at least one set of webpages using a deterministic decision tree algorithm. At least one remaining webpage may be filtered 204 from the plurality of webpages into the at least one set of webpages using a supported vector machine (SVM) algorithm.

In some implementations consistent with the present disclosure, systems and methods may be provided for filtering excerpt webpages. Filtering may generally include classifying and removing webpages from a plurality of webpages and adding the webpages to a set or subset of webpages based upon certain criteria or operations performed by one or more algorithms. For example, webpages may be collected for use as training data for machine learning applications. However, certain webpages may be excerpts or summaries of content. These excerpt webpages may be less useful as training data for machine learning applications. To deal with these unwanted webpages, the conventional approach, called "black list", may filter out the URLs which are deemed as unwanted content. However it is inefficient and ineffective to utilize these black lists because a user must manually add URL entries in the black list in order to filter out newly found pages. As such, these conventional approaches may be laborious and passive.

As will be discussed in greater detail below, embodiments of the present disclosure may determine whether a page or webpage is desirable (e.g., as training data for machine learning applications or for other uses) through the HTML structure of the webpage without any text extraction or text analysis. In this manner, webpage filtering process 10 may filter the plurality of webpages into sets of desired and undesired webpages. The desired webpages may be used as training data for machine learning applications (e.g., machine learning application 20) and the undesirable or unwanted set of webpages may be filtered out or removed from the training data. Accordingly, embodiments of the present disclosure may provide a more quick and less computationally expensive (e.g., in terms of computing power) for filtering webpages for training machine learning applications. While webpages may be filtered for use as training data in machine learning applications, it will be appreciated that the filtered webpages may be utilized for various purposes and that various types of webpages may be filtered within the scope of the present disclosure.

As will be discussed in greater detail below, embodiments of the present disclosure may provide a light weight composite machine learning (ML) approach with better performance over conventional, single one ML solution. In some embodiments, the webpage filtering process of the present disclosure may provide the following advantages: 1) a deterministic decision tree algorithm may be used to enhance the computation speed (e.g., faster than SVM by at least 5-10%) without sacrificing accuracy; and 2) the expected result may have a guaranteed accuracy. As will be discussed in greater detail below, embodiments of the present disclosure may allow a decision tree algorithm to handle a deterministic result and let the uncertain record be handled by SVM to reach the balance between bias and variance for greater computing efficiency. Embodiments of the present disclosure may, according to statistical data, filter out around 18% webpages identified as excerpt webpages, which not only saves the effort of ingesting useless documents but also avoids sending back irrelevant query result back to the customers.

In some implementations, webpage filtering process 10 may receive 200, on a computing device, a plurality of webpages. In some implementations, webpage filtering process 10 may execute or deploy a web crawler or other webpage gathering tool to collect a plurality of webpages from the Internet. As is known in the art, a web crawler may search various websites for webpages that meet specific criteria. In some implementations, the plurality of webpages may be stored in a database and/or links to the plurality of webpages may be stored in a database.

In some implementations, the at least one set of webpages may include a set of normal webpages and a set of excerpt webpages. In some embodiments, a webpage may be accessed by a Uniform Resource Locator (URL). Therefore distinctions between webpages (e.g., normal v. excerpt webpages) may be related to the structure and content of a URL.

Figure 4:
Figure 5:
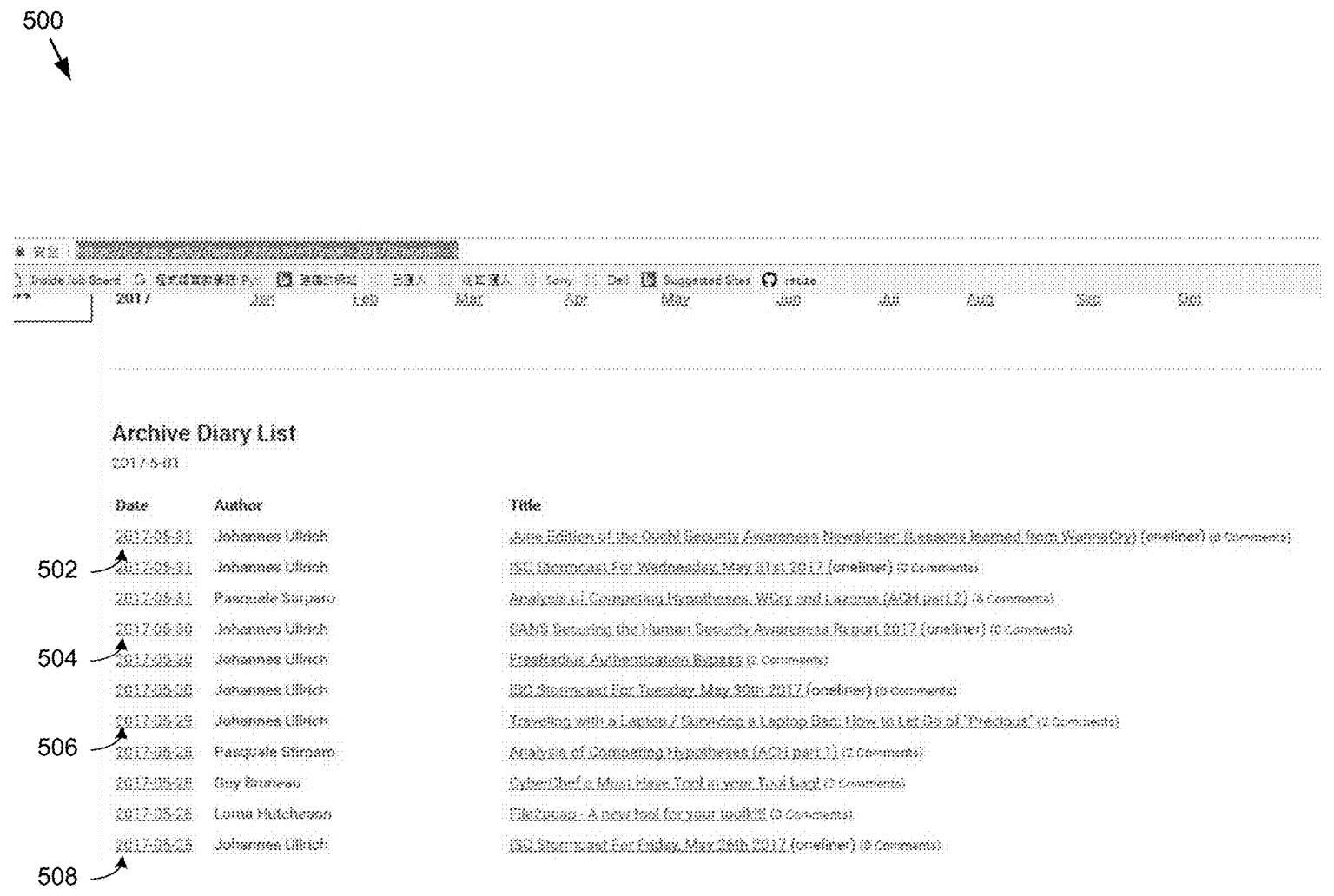

A normal webpage may generally include a webpage that includes text and other content that may be used for training data within a machine learning application. For example, suppose a webpage includes an article about e.g., cybersecurity. The actual webpage with the article may be useful as training data for a machine learning application based on the textual content of the webpage. As such, actual webpages with the relevant content may generally define normal webpages. Referring also to the examples of FIGS. 3-5, various webpages may be considered excerpt pages as they may include only an excerpt or portion of the content of a normal webpage. For example and referring also to FIG. 3, webpage 300 may be a landing page with excerpts of articles or webpages with more content (e.g., excerpts 302, 304, 306, 308). These excerpts may include the same content but may only include a small portion of the content of the normal webpage. Referring also to FIG. 4, webpage 400 may include a tagged webpage. For example, tagged webpage 400 may include various links to and excerpts of webpages that have been tagged with a particular tag (e.g., "infosec") (e.g., excerpts 402, 404, 406). Accordingly, these excerpts may only include a portion of the textual content of the normal webpage. Referring also to FIG. 5, webpage 500 may include an archive webpage. For example, archive webpage 500 may include various links to and excerpts of webpages that have been archived based on a date, author, topic, file location, etc. (e.g., excerpts 502, 504, 506, 508). Accordingly, these excerpts may only include a portion of the textual content of the normal webpage.

Figure 6:
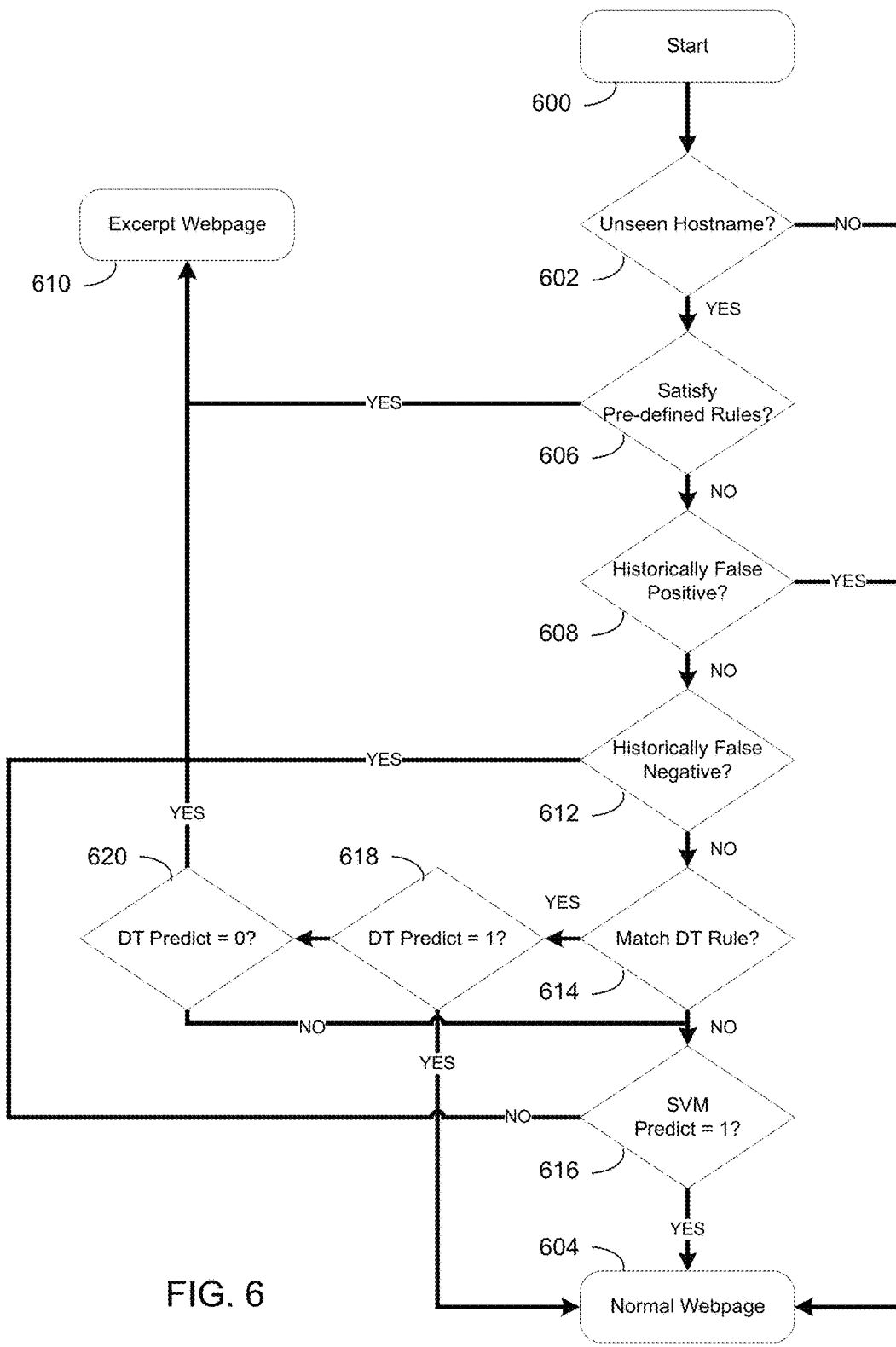
FIG. 6 is an example flowchart of the webpage filtering process of FIG. 1 according to one or more example implementations of the disclosure.

In some implementations, webpage filtering process 10 may filter 206 one or more webpages with an unseen hostname from the plurality of webpages into the at least one set of webpages. As discussed above, webpage filtering process 10 may filter the plurality of webpages into sets of desired and undesired webpages. The desired webpages may be used as training data for machine learning applications (e.g., machine learning application 20) and the undesirable or unwanted set of webpages may be filtered out or removed from the training data. Referring also to FIG. 6, webpage filtering process 10 may determine if one or more webpages from the plurality of webpages have a previously unseen (e.g., by webpage filtering process 10) hostname. If the webpage hostname is not seen during training, the webpage is not dropped and may be filtered from the plurality of webpages into the set of normal webpages. In the example flowchart of FIG. 6, an embodiment of webpage filtering process 10 may start (e.g., action 600) by determining if a webpage hostname has been seen previously or is unseen. When the webpage hostname is determined (e.g., action 602) to been unseen, the webpage may be filtered out of the plurality of webpages into a set of normal webpages (e.g., normal webpage 604). In some implementations, webpage filtering process 10 may keep all seen hostnames in a database during training. This can reduce the chance for webpage filtering process 10 making a wrong prediction regarding a webpage hostname. Periodically, the URLs with unseen hostnames may be added into the training process to make sure the new model can handle them as well in the future. When the webpage hostname is determined to have been seen previously, webpage filtering process 10 may proceed to action 606. In some implementations, action 602 may be controlled as a flag that, when enabled, filters 206 webpages with unseen hostnames to the set of normal webpages (e.g., normal webpages 604). When action 602 is disabled, webpage filtering process 10 may skip action 602 and proceed to action 606.

In some implementations, webpage filtering process 10 may filter 208 one or more webpages from the plurality of webpages into the at least one set of webpages based upon, at least in part, one or more pre-defined rules. In some implementations, action 606 may include processing the plurality of webpages with one or more hard-coded rules generated during the observation while analyzing the excerpt pages. For example, one hard-code rule may be that all URLs without a path are treated as an excerpt page. Below is one example: URL without path (e.g., excerpt page): https://www.welivesecurity.com/while the URL of webpage with a path (e.g., a normal page) may be: https://www.welivesecurity.com/2018/08/17/australian-schoolboy-apples-network/. It will be appreciated that there are many hard-coded rules which may help skip or avoid the further webpage filtering via webpage filtering process 10. At action 606 if a webpage does not satisfy the one or more pre-defined rules, webpage filtering process 10 may proceed to action 608. If a webpage satisfies the one or more pre-defined rules, webpage filtering process 10 may filter the webpage from the plurality of webpages into a set of excerpt webpages (e.g., excerpt webpage 610). For example, assume a pre-defined rule is: "Is the URL without a path?". If the webpage satisfies this pre-defined rule, webpage filtering process 10 may filter the webpage from the plurality of webpages into a set of excerpt webpages (e.g., excerpt webpage 610). If the webpage does not satisfy this pre-defined rule, webpage filtering process 10 may proceed to action 608.

In some implementations, webpage filtering process 10 may filter 210 one or more webpages from the plurality of webpages into the at least one set of webpages based upon, at least in part, a set of false positive webpages. For example, a set of false positive webpages may include webpages that have been previously or historically classified as a false positive. A false positive webpage may include a normal webpage misclassified as an excerpt webpage. In some implementations, action 608 may include determining whether the webpage is included in a set of historically or previously classified false positive webpages. If the webpage is determined to have been previously classified as a false positive webpage, webpage filtering process 10 may filter the webpage from the plurality of webpages into the at least one set of normal webpages (e.g., normal webpage 604). If the webpage is determined by webpage filtering process 10 to not be a false positive webpage, webpage filtering process 10 may proceed to action 612.

In some implementations, webpage filtering process 10 may filter 212 one or more webpages from the plurality of webpages into the at least one set of webpages based upon, at least in part, a set of false negative webpages. For example, a set of false negative webpages may include webpages that have been previously or historically classified as a false negative. A false negative webpage may include an excerpt webpage misclassified as a normal webpage. In some implementations, action 612 may include determining whether the webpage is included in a set of historically or previously classified false negative webpages. If the webpage is determined to have been previously classified as a false negative webpage, webpage filtering process 10 may filter the webpage from the plurality of webpages into the at least one set of excerpt webpages (e.g., excerpt webpage 610). If the webpage is determined by webpage filtering process 10 to not be a false negative webpage, webpage filtering process 10 may proceed to action 614.

In some implementations, webpage filtering process 10 may filter 202 at least one webpage from the plurality of webpages into at least one set of webpages using a decision tree algorithm. A decision tree algorithm may generally include a series or sequence of comparisons of structural portions of the webpage (i.e., HTML structure, URL content, etc.) to separate normal webpages and excerpt webpages. In some implementations, the series or sequence of comparisons may be determined based upon, at least in part, a minimum number of support samples. In some implementations, generating the decision tree algorithm from a plurality of rules based upon, at least in part, a minimum number of support records and a minimum confidence level. For example, webpage filtering process 10 may receive a plurality of training data. Consider the training data shown below in Table 1:

| Value of Feature 1 | Excerpt Page? |
|---|---|
| 0 | Y |
| 0 | Y |
| 0 | N |
| 1 | Y |
| 1 | N |

In the example of Table 1, a rule for a decision tree algorithm may be generated (e.g., if Feature 1=0, then the webpage is an excerpt webpage). Based on the training data in Table 1, the above example rule may represent a confidence level of 66.66% that the absence of Feature 1 indicates an excerpt webpage. For example, two of the three webpages where Feature 1=0 were excerpt pages. As such, for this rule, the confidence level may be two divided by three or 66.66%. In some implementations, webpage filtering process 10 may generate the decision tree algorithm from a plurality of rules based upon, at least in part, a minimum number of support records and a minimum confidence level. The minimum number of support of records may define a minimum number of records desired before utilizing a rule in the decision tree algorithm. The minimum confidence level may define a minimum level of confidence desired before utilizing a rule in the decision tree algorithm. In some implementations, the minimum number of records and/or the minimum confidence level may be user defined (e.g., via a user interface) and/or may be defined by webpage filtering process 10.

Returning to the above example of Table 1, if the minimum confidence level is e.g., 60% and the minimum number of support records is e.g., three records or webpages, webpage filtering process 10 may include the rule in the decision tree algorithm. However, if the minimum confidence level is e.g., 70% or the minimum number of support records is e.g., five records or webpages, webpage filtering process 10 may not include this rule in the decision tree algorithm.

Figure 7:
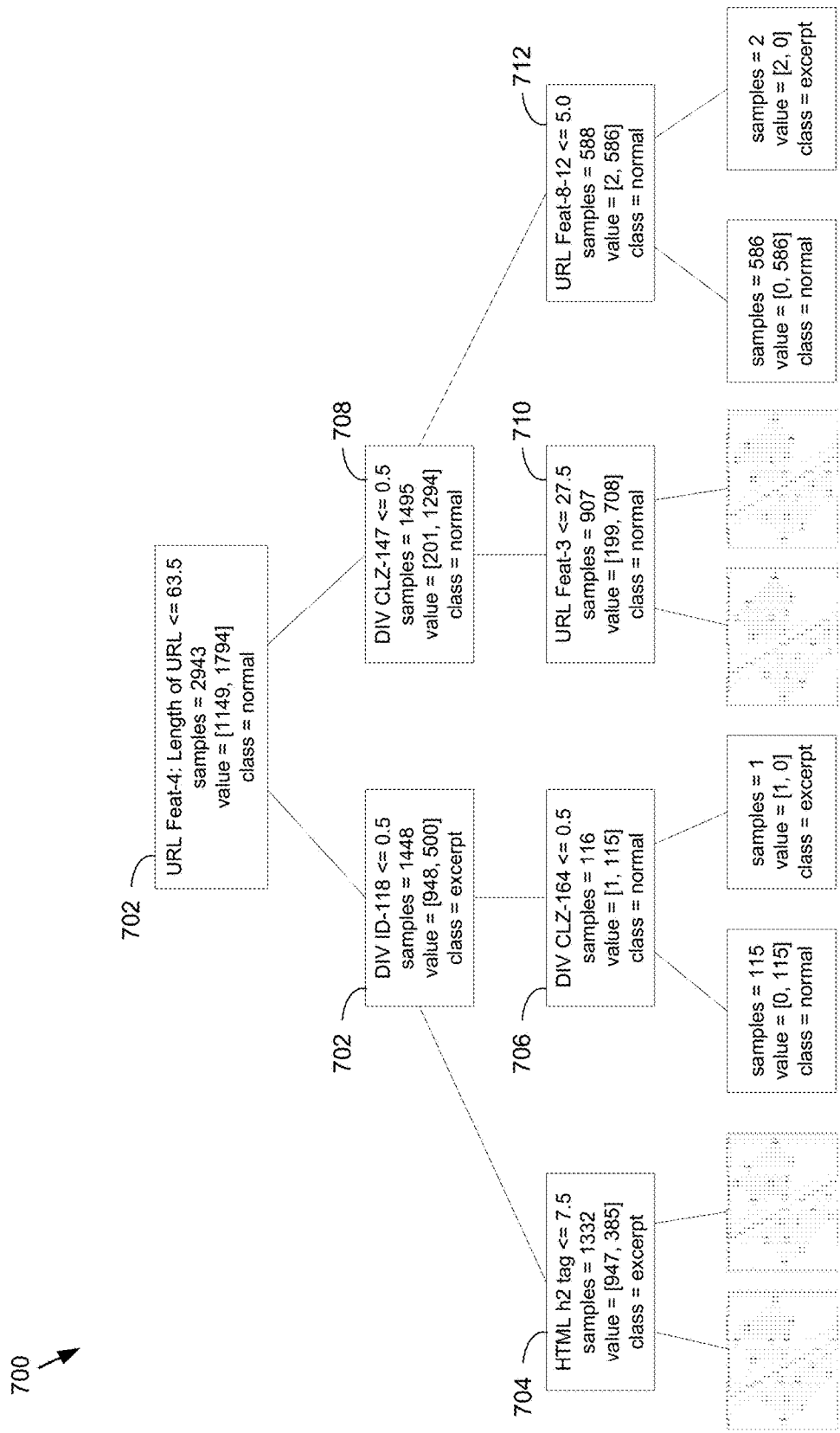
FIG. 7 is an example diagrammatic view of a decision tree algorithm according to one or more example implementations of the disclosure.
Figure 8:
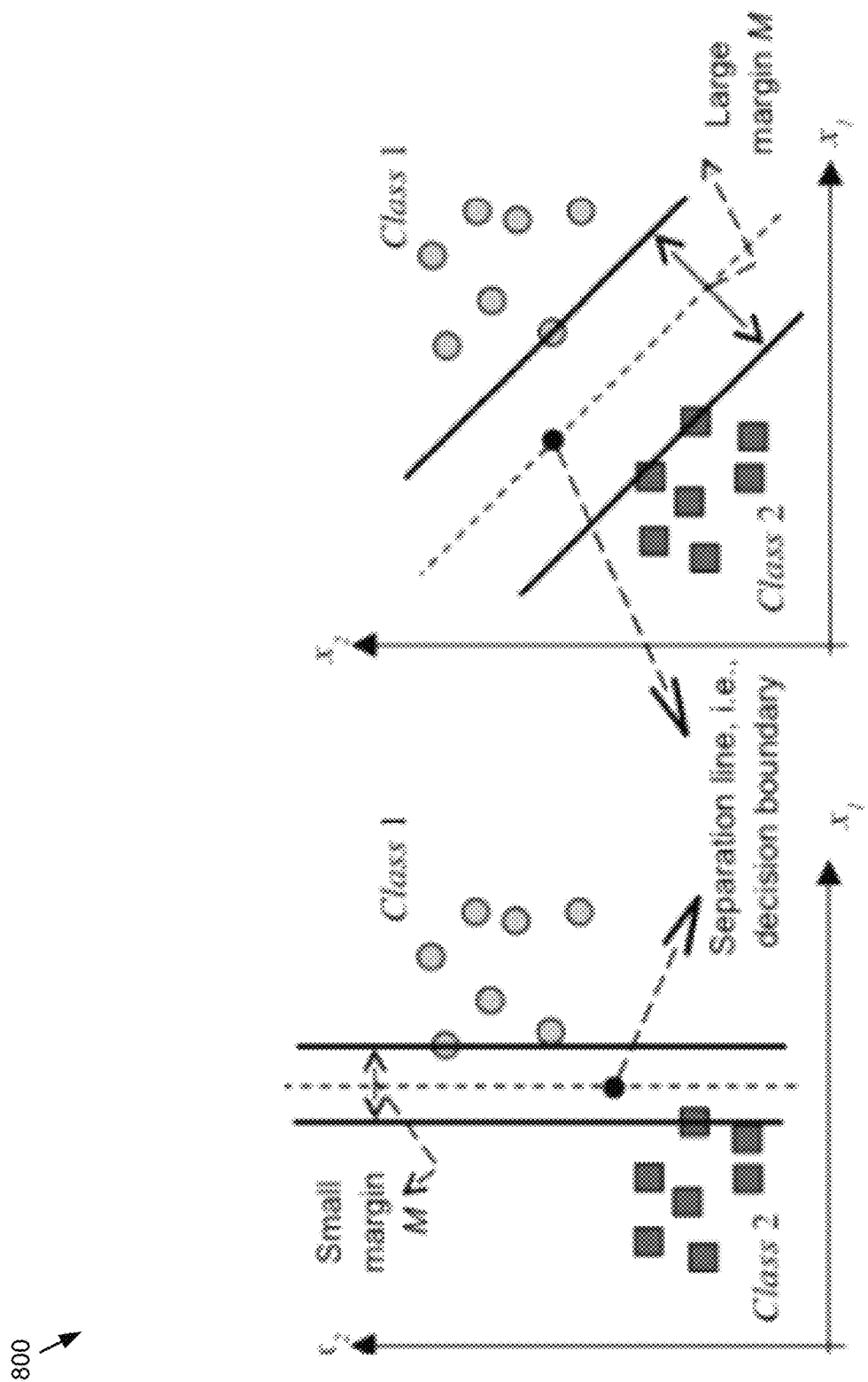
FIGS. 8-9 are example diagrammatic views of a supported vector machine (SVM) algorithm according to one or more example implementations of the disclosure.

Referring also to FIG. 7, webpage filtering process 10 may execute a series of comparisons or rules on the plurality of webpages to filter 202 at least one webpage into at least one set of webpages. For example, at action 702, webpage filtering process 10 may compare a particular HTML structural feature (e.g., the length of the URL) against a predefined value (e.g., 63.5) to separate the plurality of webpages into various branches of the decision tree algorithm. As can be seen in FIG. 7, with each succeeding action (e.g., actions 702, 704, 706, 708, 710, 712), the decision tree algorithm of webpage filtering process 10 may distinguish normal webpages from excerpt webpages. For example, action 708 may divide e.g., 1495 samples into a group of e.g., 907 samples and a group of e.g., 588 samples. Webpage filtering process 10 may, via the decision tree algorithm, divide the group of e.g., 588 samples into a group of e.g., 586 samples and a group of e.g., 2 samples at action 712. Based upon, at least in part, the number of samples, webpage filtering process 10 may filter 202 the e.g., 2 samples into the set of excerpt webpages and the e.g., 586 webpages into the set of normal webpages. As discussed above, the example of FIG. 7 may be generated from a plurality of rules based upon, at least in part, a minimum confidence level and a minimum number of support records.

In some implementations, filtering 202 the at least one webpage into the at least one set of webpages using the decision tree algorithm may include filtering 214 at least one webpage into the set of normal webpages based upon, at least in part, a first confidence score. Returning to the above example of FIG. 7, webpage filtering process 10 may filter 214 at least one page (e.g., the 586 samples) from the plurality of webpages (e.g., the 2 samples) into the set of normal webpages based upon, at least in part, a first confidence score (e.g., binary '1' or 100%). While an example of binary '1' or 100% confidence is provided, it will be appreciated that various confidence scores may be used to filter 214 at least one webpage into the set of normal webpages. The first confidence score may generally include a level of confidence that the at least one webpage is a normal webpage.

In some implementations, filtering 202 the one webpage into the at least one set of webpages using the decision tree algorithm may include filtering 216 at least one webpage into the set of excerpt webpages based upon, at least in part, a second confidence score. Returning to the above example of FIG. 7, webpage filtering process 10 may filter 216 at least one page (e.g., the 2 samples) from the plurality of webpages (e.g., the 586 samples) into the set of excerpt webpages based upon, at least in part, a second confidence score (e.g., binary '0' or 0%). While an example of binary '0' or 0% confidence is provided, it will be appreciated that various confidence scores may be used to filter 216 at least one webpage into the set of excerpt webpages. The second confidence score may generally include a level of confidence that the at least one webpage is an excerpt webpage. For example, where a 100% confidence score is indicative that the webpage is a normal webpage while a 0% confidence score is indicative of a high level of confidence that the webpage is not a normal webpage but is an excerpt webpage. A 50% confidence score may indicate the lowest confidence that the webpage is either a normal webpage or an excerpt webpage. For example and as discussed above, the decision tree algorithm may be generated based upon, at least in part, a minimum confidence level and a minimum number of support records. In some implementations and as shown in FIG. 7, the decision tree algorithm may be unable to filter each of the plurality of webpages into the set of normal webpages or the set of excerpt pages. For example, the sequence of rules of the decision tree algorithm may be unable to filter the plurality of webpages based upon, at least in part, either the first or the second confidence score (e.g., the decision tree algorithm is unable to predict (e.g., a 100% confidence score) that the webpage is a normal page and/or is unable to predict (e.g., a 0% confidence score) that the webpage is an excerpt page). In this manner and as will be discussed below, webpage filtering process 10 may filter 204 at least one remaining webpage from the plurality of webpages into the at least one set of webpages using a supported vector machine (SVM) algorithm.

Returning to the example of FIG. 6, webpage filtering process 10 may determine 614 whether there is a decision tree algorithm to process the plurality of webpages. If webpage filtering process 10 determines 614 that there is not a decision tree algorithm, webpage filtering process 10 may proceed to action 616. If there is a decision tree algorithm, webpage filtering process 10 may proceed to action 618. In preferred implementation, webpage filtering process 10 may proceed to action 618 as filtering 202 the plurality of webpages with a decision tree algorithm may generally be attempted prior to filtering 204 the plurality of webpages using the supported vector machine (SVM) algorithm.

As discussed above and in some implementations, webpage filtering process 10 may determine 618 for each webpage, whether the decision tree algorithm can filter 214 the webpage into the set of normal webpages based upon, at least in part, the first confidence score. If the decision tree algorithm is unable to filter 214 the webpage into the set of normal webpages based upon, at least in part, the first confidence score, webpage filtering process 10 may proceed to action 620 and determine, for each webpage, whether the decision tree algorithm can filter 216 the webpage into the set of excerpt webpages based upon, at least in part, the second confidence score. As discussed above, the second confidence score may indicate a high level of confidence that the webpage is not a normal webpage and is an excerpt webpage. If the decision tree algorithm is unable to filter 216 the webpage into the set of excerpt webpages, webpage filtering process 10 may proceed to action 616. In this manner, webpage filtering process 10 may determine if the decision tree algorithm is able to deterministically filter the webpages into a set of normal or excerpt webpages prior to using the more computationally expensive supported vector machine algorithm.

In some implementations, webpage filtering process 10 may filter 204 at least one remaining webpage from the plurality of webpages into the at least one set of webpages using a supported vector machine (SVM) algorithm. In some implementations, webpage filtering process 10 may filter 204 at least one remaining webpage from the plurality of webpages into either the normal or excerpt set of webpages using a SVM algorithm. As is known in the art, for SVM, a machine learning model may be generated to give a prediction. SVM (Supported Vector Machine) is intuitively a model to find a math formula to separate the "wanted" and "un-waned" with maximum gap. For example and referring also to FIG. 8, if w1*a+w2*b>=0, webpage filtering process 10 may filter 204 the at least one remaining webpage into the set of excerpt pages. Otherwise, webpage filtering process 10 may filter the remaining webpage into the set of normal webpages. The weighting (w1, w2) of the above formula is learned during training while a and b are features given by observation. Accordingly, SVM may be effective at filtering the at least one remaining webpages into the normal or excerpt set of webpages.

Figure 9:
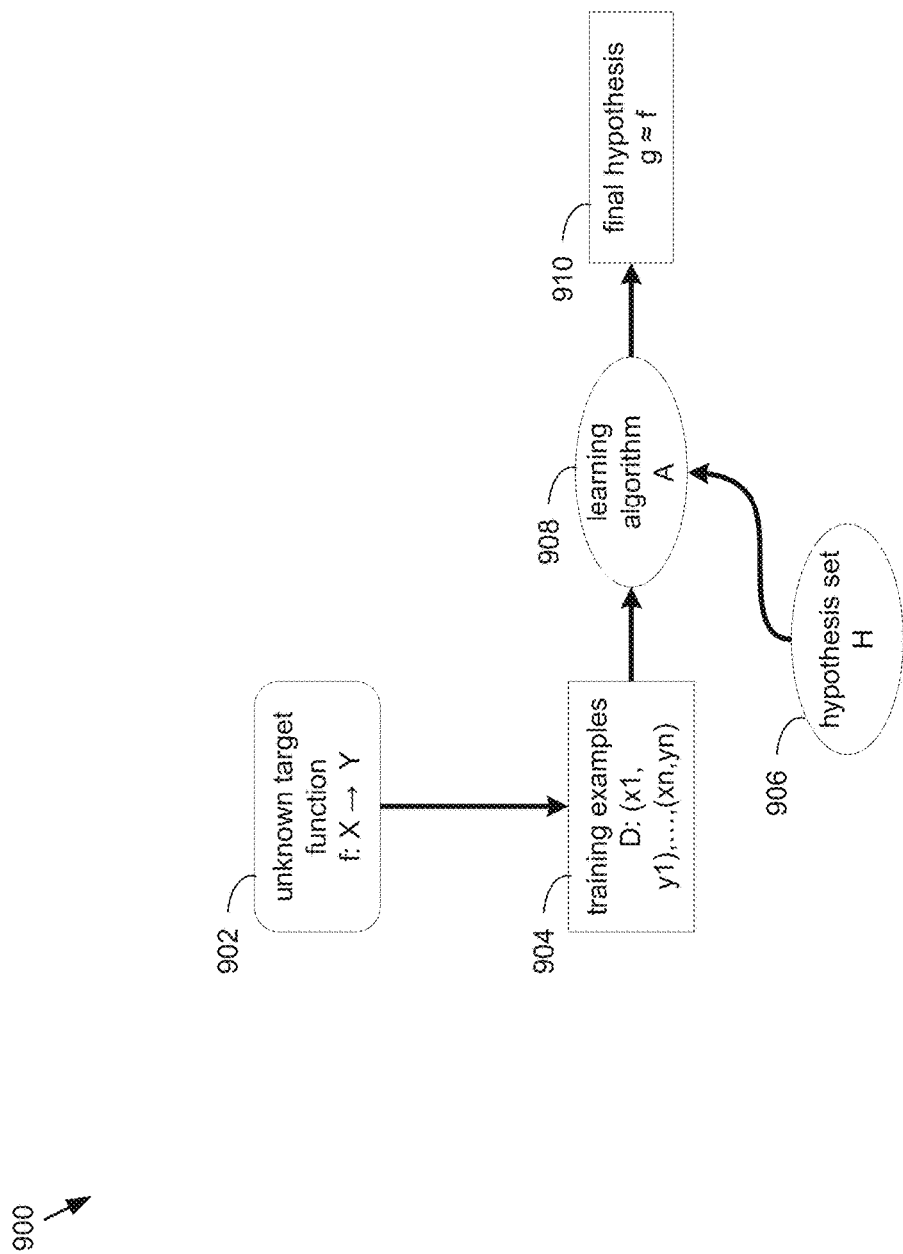

Referring also to FIG. 9, SVM may generally include an unknown target function (e.g., unknown target function 902), a plurality of training examples (e.g., training examples 904), a hypothesis set (e.g., hypothesis set 906), a learning algorithm (e.g., learning algorithm 908), and a final hypothesis (e.g., final hypothesis 910). In this example, the unknown target function (e.g., unknown target function 902) may generally refer to the target function that classifies normal and excerpt webpages from the plurality of webpages. The plurality of training data (e.g., training examples 904) may include a plurality of webpages or URLs. In some implementations, the hypothesis set (e.g., hypothesis set 906) may include a plurality of HTML tags, URL outlook, Class/ID of HTML tag DIV/SPAN, etc. as features. In some implementations, the learning algorithm (e.g., learning algorithm 908) may include any machine learning algorithm. In one example, the learning algorithm may be Scikit-learn SVC where gamma is "auto" and "C"="1".

In some implementations and returning to the example of FIG. 7, action 708 may divide e.g., 1495 samples into a group of e.g., 907 samples and a group of e.g., 588 samples. Webpage filtering process 10 may divide the group of e.g., 907 samples into a group of e.g., 708 samples and a group of e.g., 199 samples at action 710. At this point, webpage filtering process 10 may be unable to filter 202 the webpages into the set of normal webpages or excerpt webpages using the decision tree algorithm. Accordingly, webpage filtering process 10 may filter 204 the 199 samples and the 907 samples via an SVM algorithm.

In some implementations, webpage filtering process 10 may include continuous monitoring and improvement (ALP) over classifier performance. In this manner, website filtering process 10 may be semi-supervised by adopting ALP. One benefit of applying ALP may include not requiring a technician to verify all new data collected or received by webpage filtering process 10. For example, instead of having a human verify all new data, webpage filtering process 10 may define a portion or sample of data called a "block" of webpages. For example, for a block of e.g., 50 webpages, webpage filtering process 10 may request supervision to verify only webpages that webpage filtering process doesn't have a threshold level of confidence for filtering (e.g., excerpt webpage or normal webpage) within that block of e.g., 50 webpages.

Figure 10:
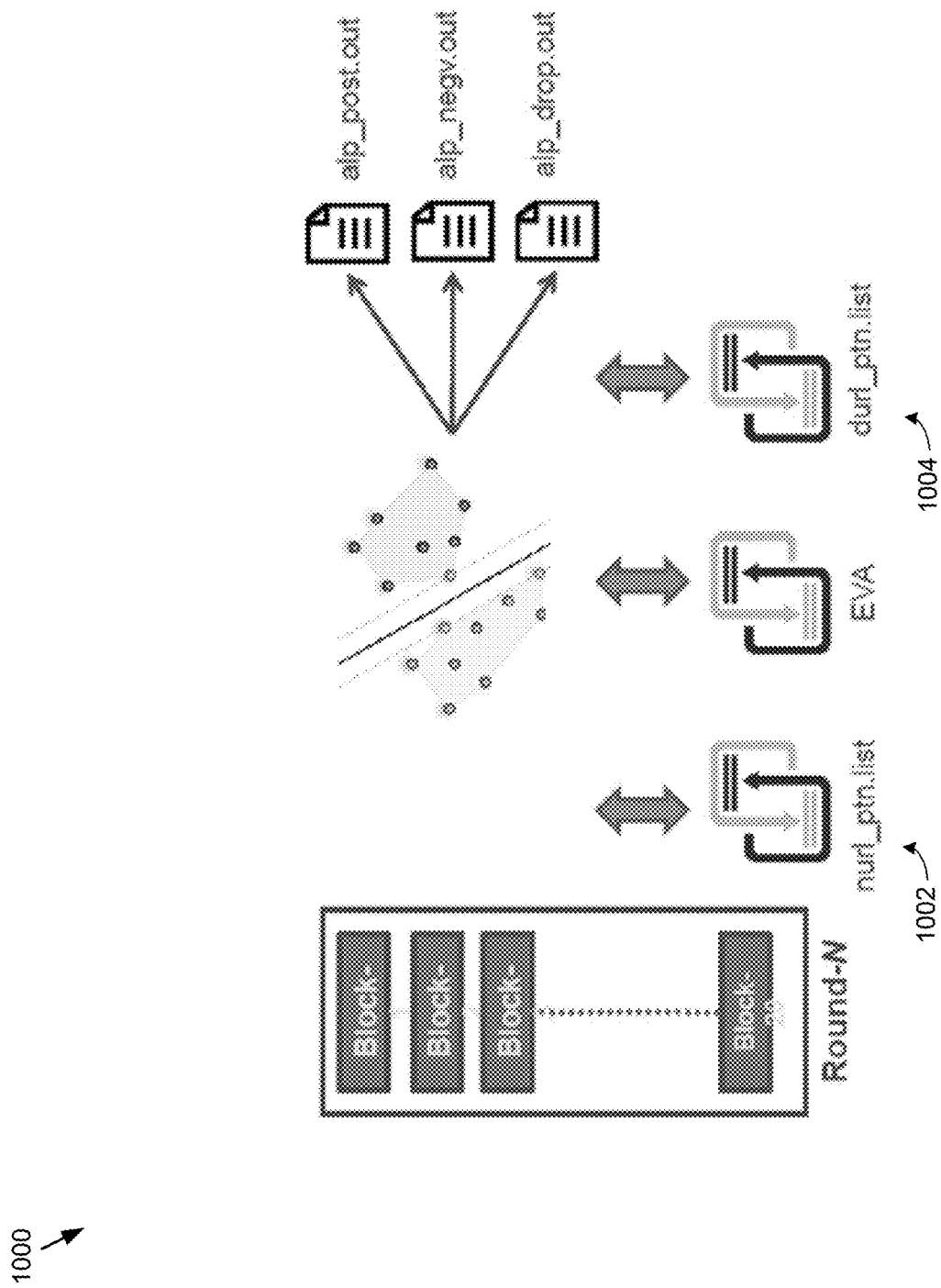
FIG. 10 is an example diagrammatic view of an Active Learning Process (ALP) according to one or more example implementations of the disclosure.

In this manner, a technician may not have to pay attention to or supervise all data if all the data can be handled by the decision tree algorithm for an acceptable confidence setting. On the contrary, if supervision or feedback is provided (i.e., by receiving a classification for one or more webpages) to webpage filtering process 10, a machine learning model may be retrained and webpage filtering process 10 may use the supervised input to handle webpages from the next block. As shown in FIG. 10, in order to reduce the times of inquiry for semi-supervision, webpage filtering process 10 may match a URL in one of two files or lists, e.g., nurl.ptn.list 1002 and/or durl.ptn.list 1004. In some implementations, a first list, e.g., nurl_ptn.list 1002, may be a list of regular expressions for URLs of normal webpages. For example, any URL that matches or hits the regular expression may be classified or filtered from the plurality of webpages into the set of normal webpages. In some implementations, a second list, e.g., durl_ptn.list 1004, may be a list of regular expressions for URLs or webpages that are not normal webpages. For example, any URL that matches or hits a regular expression in the second list may be skipped from filtering. These skipped webpages may represent webpages that are not normal webpages. In some implementations, files with the file extension ".out" may define logs configured to hold the accumulated statistic data after ALP.

Figure 11:
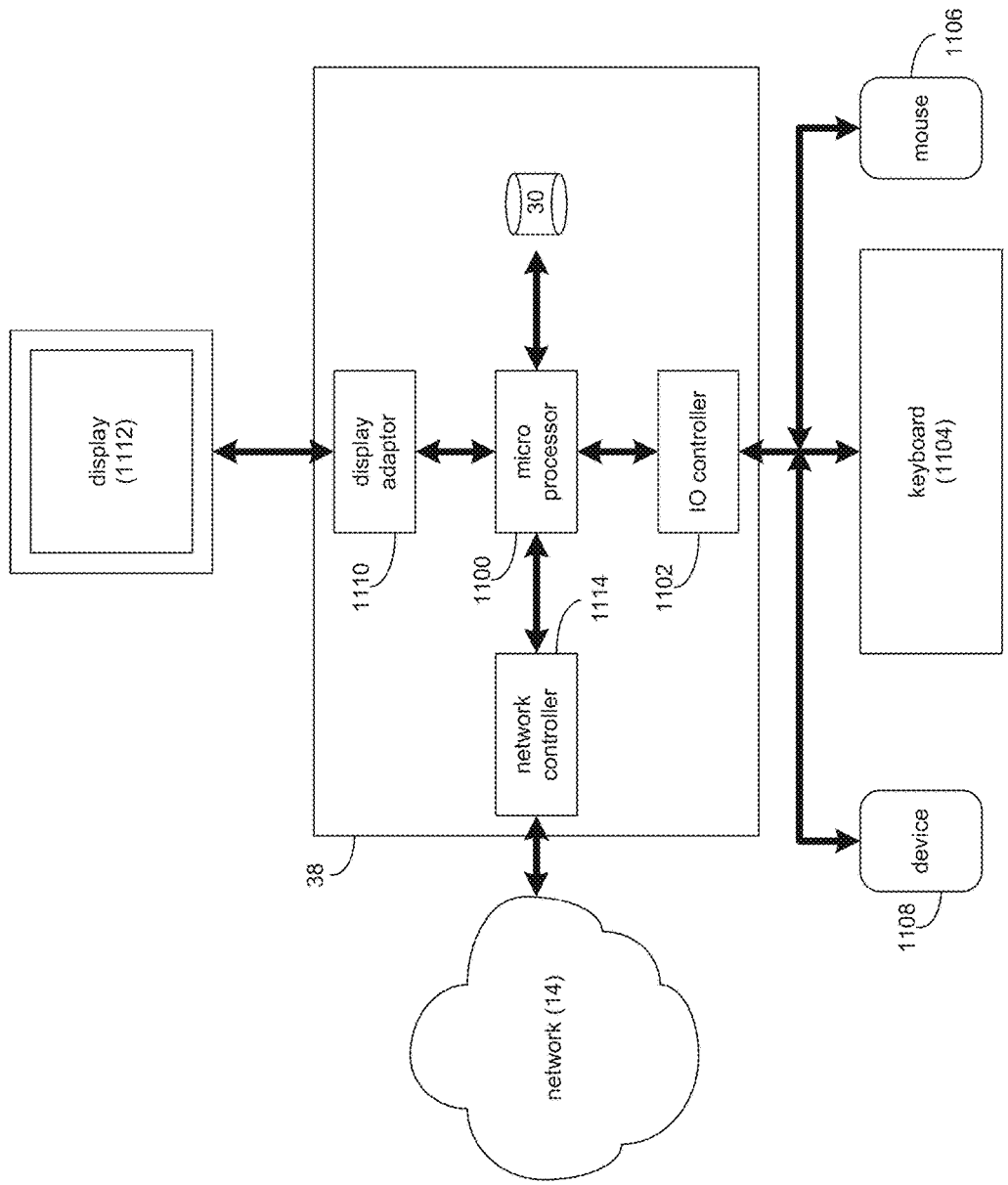
FIG. 11 is an example diagrammatic view of a client electronic device of FIG. 1 according to one or more example implementations of the disclosure.

Referring also to FIG. 11, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, webpage filtering process 10 may be substituted for client electronic device 38 within FIG. 11, examples of which may include but are not limited to computing device 12 and/or client electronic devices 40, 42, 44.

Client electronic device 38 may include a processor and/or microprocessor (e.g., microprocessor 1100) configured to, e.g., process data and execute the above-noted code/instruction sets and subroutines. Microprocessor 1100 may be coupled via a storage adaptor (not shown) to the above-noted storage device(s) (e.g., storage device 30). An I/O controller (e.g., I/O controller 1102) may be configured to couple microprocessor 1100 with various devices, such as keyboard 1104, pointing/selecting device (e.g., mouse 1106), custom device, such a microphone (e.g., device 1108), USB ports (not shown), and printer ports (not shown). A display adaptor (e.g., display adaptor 1110) may be configured to couple display 1112 (e.g., CRT or LCD monitor(s)) with microprocessor 1100, while network controller/adaptor 1114 (e.g., an Ethernet adaptor) may be configured to couple microprocessor 1100 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, on a computing device, a plurality of webpages;
filtering at least one webpage from the plurality of webpages into at least one set of webpages using a decision tree algorithm; and
filtering at least one remaining webpage from the plurality of webpages into the at least one set of webpages using a supported vector machine (SVM) algorithm.

2. The computer-implemented method of claim 1, further comprising:
filtering one or more webpages with an unseen hostname from the plurality of webpages into the at least one set of webpages.

3. The computer-implemented method of claim 1, further comprising:
filtering one or more webpages from the plurality of webpages into the at least one set of webpages based upon, at least in part, one or more pre-defined rules.

4. The computer-implemented method of claim 1, further comprising:
filtering one or more webpages from the plurality of webpages into the at least one set of webpages based upon, at least in part, a set of false positive webpages.

5. The computer-implemented method of claim 1, further comprising:
filtering one or more webpages from the plurality of webpages into the at least one set of webpages based upon, at least in part, a set of false negative webpages.

6. The computer-implemented method of claim 1, wherein the at least one set of webpages includes a set of normal webpages and a set of excerpt webpages.

7. The computer-implemented method of claim 1, wherein filtering the at least one webpage into the at least one set of webpages using the decision tree algorithm includes one or more of:
filtering the at least one webpage into a set of normal webpages based upon, at least in part, a first confidence score, and
filtering the at least one webpage into a set of excerpt webpages based upon, at least in part, a second confidence score.

8. A computer program product comprising a non-transitory computer readable storage medium having a plurality of instructions stored thereon, which, when executed by a processor, cause the processor to perform operations comprising:
receiving a plurality of webpages;
filtering at least one webpage from the plurality of webpages into at least one set of webpages using a decision tree algorithm; and
filtering at least one remaining webpage from the plurality of webpages into the at least one set of webpages using a supported vector machine (SVM) algorithm.

9. The computer program product of claim 8, further comprising instructions for:
filtering one or more webpages with an unseen hostname from the plurality of webpages.

10. The computer program product of claim 8, further comprising instructions for:
filtering one or more webpages from the plurality of webpages based upon, at least in part, one or more pre-defined rules.

11. The computer program product of claim 8, further comprising instructions for:
filtering one or more webpages from the plurality of webpages based upon, at least in part, a set of false positive webpages.

12. The computer program product of claim 8, further comprising instructions for:
filtering one or more webpages from the plurality of webpages based upon, at least in part, a set of false negative webpages.

13. The computer program product of claim 8, wherein the at least one set of webpages includes a set of normal webpages and a set of excerpt webpages.

14. The computer program product of claim 8, wherein filtering the at least one webpage into the at least one set of webpages using the decision tree algorithm includes one or more of:
  filtering the at least one webpage into a set of normal webpages based upon, at least in part, a first confidence score, and
  filtering the at least one webpage into a set of excerpt webpages based upon, at least in part, a second confidence score.

15. A computing system including one or more processors and one or more memories configured to perform operations comprising:
  receiving a plurality of webpages;
  filtering at least one webpage from the plurality of webpages into at least one set of webpages using a decision tree algorithm; and
  filtering at least one remaining webpage from the plurality of webpages into the at least one set of webpages using a supported vector machine (SVM) algorithm.

16. The computing system of claim 15, wherein the operations further comprise:
  filtering one or more webpages with an unseen hostname from the plurality of webpages.

17. The computing system of claim 15, wherein the operations further comprise:
  filtering one or more webpages from the plurality of webpages based upon, at least in part, one or more pre-defined rules.

18. The computing system of claim 15, wherein the operations further comprise:
  filtering one or more webpages from the plurality of webpages based upon, at least in part, a set of false positive webpages.

19. The computing system of claim 15, wherein the operations further comprise:
  filtering one or more webpages from the plurality of webpages based upon, at least in part, a set of false negative webpages.

20. The computing system of claim 15, wherein the at least one set of webpages includes a set of normal webpages and a set of excerpt webpages.

* * * * *